United States Patent Office 2,742,448
Patented Apr. 17, 1956

2,742,448

EPOXY RESIN COMPOSITIONS CONTAINING TITANATE

Harry H. Beacham, Plainfield, and Kenneth M. Merz, New Brunswick, N. J., assignors to National Lead Company, New York, N. Y., a corporation of New Jersey No Drawing. Application March 3, 1953,
Serial No. 340,154

4 Claims. (Cl. 260—47)

This invention relates to film-forming and drying compositions of matter. More specifically, it relates to film-forming compositions containing epoxy resins. Still more specifically, it relates to such coating compositions which are relatively fast drying and easily cured compared with those heretofore known.

The so-called epoxy resins constitute one of the newer and more useful classes of resins for use in coating compositions. These resins are ordinarily prepared by con-

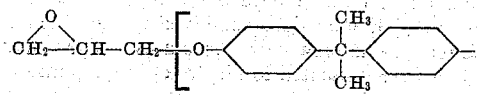

densation of phenols with ketones to form bisphenols and subsequent reaction of the bisphenol with an epichlorohydrin to produce a resin monomer. This resin monomer is then polymerized using a basic catalyst such as an amine to form a linear polymer having the repeating unit formula:

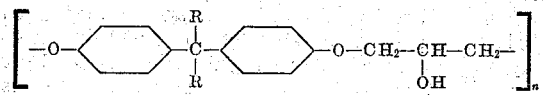

wherein "n" is ordinarily about 3 to 4 and the two R groups are those of the ketone used. This partially polymerized epoxy resin may then be used in varnish or other coating formulations along with suitable drying oils, thinners, etc. The usual practice is to esterify at least some of the secondary hydroxyl groups of the above formula with suitable drying oil fatty acids, to give oil-modified epoxy resin compositions which may be partially cured by air-drying, resulting in oxidation of the drying oil portion of the molecule, and if so desired may be further cured by increasing the degree of linear polymerization (i. e. increasing the value of "n" in the above formula). This additional linear polymerization may be brought about by the addition of "converting agents" such as diethylene triamine and butylated urea-formaldehyde. These agents, however, require a high cure temperature, for example 375–450° C., or if added in sufficiently large quantities to bring about room temperature drying, tend to cause dulling and clouding in the film. These known converting agents also suffer from another serious disadvantage in that their curing action cannot be controlled and, while excessive temperatures are required for complete curing, a partial polymerization takes place almost immediately upon addition of the curing agent even at room temperature, and this limits the use of these compositions to applications which will tolerate the addition of converting agent just before use. These and other disadvantages in known methods of curing oil-modified epoxy resins have been overcome by using alkyl titanates as the curing agents, as more fully described and claimed in copending application Serial No. 323,523, filed December 1, 1952.

For some applications of the epoxy resins, particularly where maximum hardness, chemical inertness and dielectric strength are required, however, it is frequently desirable to use the epoxy resins in "unmodified" form, i. e. having no more than half of the secondary hydroxyl groups esterified with drying oils, and in many cases having no drying oil added at all. The term "unmodified" as used herein, is to be understood as embracing both epoxy resins which have not been oil-modified at all, and resins which have been modified to a minor degree, for example those having half or less of their secondary hydroxyl groups esterified with drying oil fatty acids. As pointed out in the above-mentioned application, Serial No. 323,523, the usefulness of the alkyl titanates in general for the curing of epoxy resins is limited to those epoxy resins having at least half of their secondary hydroxyl groups so esterified. Unmodified epoxy resins or those modified to substantially less than 50% esterification tend to react too rapidly with most alkyl titanates, resulting in premature gelation and decreased can stability.

The epoxy modified resins contemplated by the instant invention are described in detail in an article by the Technical Staff of the Shell Chemical Corporation in the Paint, Oil and Chemical Review, November 9, 1950, pages 15–18 and 48–49. This publication shows that the epoxy resins are of the formula:

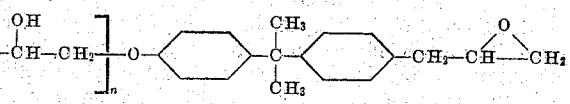

and such resins are prepared from bisphenol and epichlorhydrin.

Moreover, the abovementioned disadvantages inherent in the oil-modified epoxy resins when cured with conventional curing agents such as diethylene triamine and butylated urea-formaldehyde apply equally well in the case of this latter class of epoxy resins, viz. those which are not oil-modified or are oil-modified to the extent of less than 50% esterification of the secondary hydroxyl groups. The unmodified epoxy resins, like the highly oil-modified epoxy resins, require high cure temperatures when using conventional curing agents or alternatively require excessive amounts of such curing agents, with resultant deterioration of the film, and additionally possess very poor can stability.

An object of this invention, therefore, is to provide an improved epoxy resin coating composition. A further object is to produce a coating composition comprising an epoxy resin having no more than half of the secondary hydroxyl groups of said resin esterified with drying-oil fatty acids, which may be cured to a clear film at room temperature or upon light oven heating. An additional object is to provide such an epoxy resin composition which may be shipped and stored in ready-for-use condition. Another object is to provide such a resin coating composition which possesses improved flexibility, hardness, adhesion and solvent resistance and is characterized by formation of clear transparent films. Still another object is to provide a coating composition having improved dielectric strength. Other objects and advantages will become apparent from the following more complete description and claims.

In its broadest aspects this invention contemplates a film-forming composition comprising an epoxy resin having no more than half of the hydroxyl groups of said resin esterified with drying oil fatty acids, an alkyl titanate, and an amine complexing agent. In a particularly desirable embodiment this invention contemplates a film-forming composition comprising an epoxy resin having the repeating unit formula:

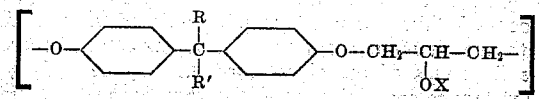

wherein R and R' represent aliphatic or aromatic hydrocarbon groups, at least half and up to substantially all of the X groups in said repeating unit are hydrogen atoms and the remainder of said X groups are the acyl groups of drying-oil fatty acids, an alkyl titanate, and an amine complexing agent. Substantially any epoxy resin, whether highly oil-modified, slightly oil-modified, or not oil-modified at all, may be employed in compositions according to the present invention, but in the case of the highly oil-modified epoxy resins, there is no particular advantage in having the amine complexing agent present, since such resins may be cured with alkyl titanates alone. Moreover, substantially any alkyl titanate may be employed, but it is preferred that the alkyl titanate chosen be a titanate of an alcohol containing no more than about 20 and even more preferably, no more than about 12 carbon atoms. The reaction which takes place between the alkyl titanate and the epoxy resin resulting in curing of the latter is believed to be an ester interchange which liberates the alcohol corresponding to the titanate employed. When the higher alcohols containing more than 20 carbon atoms are used, they remain dispersed in the film, and when titanates of alcohols containing more than about 12 carbon atoms are used, they remain in the film unless removed by prolonged oven drying. While the presence of alcohol in the film is not necessarily undesirable and may even serve in some cases a useful purpose such as that of plasticizing the film, it is generally preferred that the finished film contain no alcohol especially since the presence of alcohol tends to retard polymerization of the epoxy chain, and it is for this reason that the titanates of lower alcohols are generally preferred. The action of the alcohol in retarding polymerization is most noticeable in varnishes containing the titanates of the low molecular weight active alcohols. Such a varnish may be stored for long periods of time in a covered container and is not particularly affected by such storage. Once the alcohol is allowed to evaporate, however, the polymerization proceeds and a film or a gel is produced which is insoluble in alcohol or other common organic solvents. For applications in which air-drying is desirable and the presence of an alcohol in the film is undesirable, it is most desirable to employ titanates of alcohols which contain no more than about five carbon atoms since these alcohols will readily evaporate from the film during the course of room-temperature drying. On the other hand, it is preferred to use the titanates of alcohols which contain at least two carbon atoms for, although methyl titanates are completely operable, they are less stable than the titanates of the higher alcohols and, therefore, somewhat less convenient to employ.

The exact mechanisms of the reactions which take place in the curing of the film are not definitely known, but it is believed that the alkyl titanate reacts with the secondary hydroxyl groups and probably with the terminal groups of the partially polymerized resin chain to liberate the alcohol corresponding to the titanate employed while the hydroxyl groups involved are converted to R—O—Ti—O—R linkages. To moderate the course of this reaction which takes place quite easily and results in premature gelation when "unmodified" epoxy resins are employed, it becomes necessary to add the amine complexing agents of this invention. These complexing agents may be characterized in general as comprising an ethylene or alkyl-substituted ethylene group $$(-CH-CH-)$$
$$\quad | \quad |$$
$$\quad R \quad R$$

wherein one of the carbons of said ethylene group carries a substituent amino group while the other of said carbons is linked to titanium either by a TiO—C bond or by another substituent amino group capable of coordinating with the titanium atom to be complexed and wherein the R groups of the above formula may be hydrogen, alkyl groups containing up to 6 carbon atoms, or amine-substituted alkyl groups containing up to 6 carbon atoms.

Examples of such amine complexing agents are ethylene diamine, propylene diamine, β-aminoethyl ethanolamine, and analogous polyethylene amines, all of which form five-membered ring structures by coordination of two amino groups with a titanium atom resulting in a

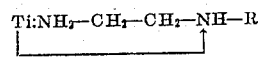

ring structure, and ethanolamine titanates wherein the titanate molecule is self-complexed by coordination of the terminal amino group with the titanium atom to form a five-membered

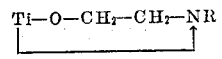

ring structure. These proposed structures and mechanisms are not completely established or understood and are, therefore, not to be taken as limitative, but are advanced as one possible explanation of the observed facts, namely that compounds containing

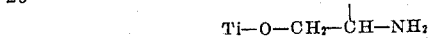

or

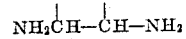

structures are useful in preventing the rapid reaction and gelation which take place when "unmodified" epoxy resins and alkyl titanates are combined in the absence of compounds containing such structures. The following examples are presented to illustrate the preparation and use of the novel coating compositions of this invention.

*Example I*

A resin solution was prepared from equal parts of Epon 1007, a condensation product of a bisphenol and epichlorohydrin having an epoxy equivalent of 0.05, diacetone alcohol, and ethylene glycol monoethyl ether. A curing agent for this resin solution was prepared by mixing 340 parts of tetrabutyl titanate and 60 parts of ethylene diamine and dissolving the resulting solid complex in 2400 parts of isobutanol. 50 parts of the resin solution and 12 parts of the curing agent solution were mixed while heating slightly to dissolve the complex. Moderate agitation was supplied during the mixing period to prevent premature gelation caused by local excesses of curing agent. The resulting solution was drawn down on a steel panel at about 3 mil film thickness and allowed to dry several days at room temperature. The resulting film was clear, transparent and uniform. It had a Sward Rocker hardness of about 47 and was sufficiently flexible to withstand 30% distention on a Bell Telephone Laboratory conical mandrel.

Another portion of the same titanated solution was kept in a closed container for three months and drawn down on a panel as described above. The appearance and viscosity of the varnish, the drying characteristics, and the quality of film produced were substantially unchanged by aging.

*Example II*

A resin solution similar to that described in Example I was prepared, substituting Epon 1001 (epoxy equivalent of 0.19–0.20) for the Epon 1007. A curing agent was prepared by mixing 340 parts of tetrabutyl titanate and 265 parts β-aminoethylethanolamine. This mixture formed a viscous liquid which was dissolved in 3600 parts of ethylene glycol monoethylether. 10 parts of this curing agent solution were dissolved in 50 parts of the resin solution with slight warming and agitation as in Example I. The resulting mixture was applied to a steel panel and baked at 150° C. for 45 minutes. The resulting film was again clear, light in color, hard and flexible with good adhesion and no visible checking or cracking.

*Example III*

Another resin solution was prepared from equal parts of Epon 1009, a condensation product of a bisphenol and epichlorohydrin having an epoxy equivalent of 0.03 diacetone alcohol and ethylene glycol monoethyl ether. The curing agent used in this case was a triethanolamine titanate prepared by mixing equimolecular proportions of butyl titanate and triethanolamine. Seven parts (5%) of this triethanolamine titanate (containing also the liberated butanol) were added to 300 parts of the resin solution and drawn down on a steel panel. The film was baked for one hour at 150° C.; the baked film was similar to those produced in Examples I and II.

*Example IV*

A short oil-modified resin was prepared by cooking 60 parts of Epon 1004, a condensation product of a bisphenol and epichlorohydrin having an epoxy equivalent of 0.11–0.12 and 40 parts of dehydrated castor oil acids in a closed kettle using an inert gas stream (nitrogen) and a mechanical agitator to insure thorough mixing. Heating was continued approximately 1½ hours until a temperature of 250° C. was reached. The batch was maintained at this temperature for approximately two hours and the acid number was determined periodically. When the acid number had dropped to a value of 5.0, the heating was stopped and upon cooling to 200° C., the mixture was thinned with an equal weight of xylene. The viscosity of the thinned solution was Y (Gardner Scale). A curing agent for this varnish was prepared by mixing 55 parts of monoabietyl tributyl titanate, and 10 parts of 1,3 diamino-2-propanol. This mixture was thinned with 65 parts of benzyl alcohol. Ten parts of the so-prepared curing agent solution were dissolved in 90 parts of the previously prepared thinned varnish. The mixture was then applied to a steel panel and air-dried overnight. The film produced was substantially similar with those produced in the preceding examples.

*Example V*

The procedure of Example I was repeated substituting a complex prepared by mixing 45 parts of dioctyl dibutyl titanate with 7.4 parts of propylene diamine for the butyl titanate-ethylene diamine complex of Example I. Instead of air-drying as in Example I, this composition was oven-dried for one hour at 150° C. The results were substantially identical with those produced in Example I.

It will be noted that the above examples show the use of epoxy resins from a particular source, namely the "Epon" resins manufactured and marketed by the Shell Chemical Corporation. These resins are typical of the epoxy resins in general to which the present invention applies, and are more fully described in the Shell Company's brochure entitled "Epon Surface Coating Resins, Technical Bulletin SC:50–40." Obviously the same principles will apply to epoxy resins from any source.

While this invention has been described and illustrated by the examples shown, it is not intended to be strictly limited thereto, and other variations and modifications may be employed within the scope of the following claims.

We claim:

1. A film forming composition comprising an epoxy resin having the repeating unit formula:

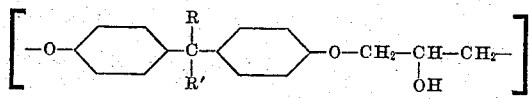

wherein R and R' are monovalent hydrocarbon radicals, and a substance selected from the group consisting of (a) an alkyl orthotitanate in admixture with an amine selected from the group consisting of a saturated aliphatic hydroxyamine in which the hydroxy group is in the beta position relative to an amino group and a polyamine in which two amino groups are separated by two carbon atoms and (b) an orthotitanate of a hydroxyamine in which the hydroxy group is in the beta position relative to an amino group.

2. Composition comprising an epoxy resin defined in claim 1 and β-aminoethylethanolamine titanate.

3. Composition comprising an epoxy resin defined in claim 1, butyl titanate and ethylene diamine.

4. Composition comprising an epoxy resin defined in claim 1, butyl titanate and propylene diamine.

References Cited in the file of this patent

UNITED STATES PATENTS 2,512,996    Bixler _____ June 27, 1950

OTHER REFERENCES

Shell Chemical Corp., Technical Bulletin SC:52–6, "Epon Resins for Laminating," page 1.

Chemical & Engineering News, vol. 31, No. 45, page 4680, November 9, 1953.

Jungnickel et al.: in "Organic Analysis," vol. 1, N. Y., 1953, pages 127 and 128.